(12) United States Patent
Zhou et al.

(10) Patent No.: US 12,009,917 B2
(45) Date of Patent: Jun. 11, 2024

(54) RATE MATCHING FOR LAYER 1 (L1) OR LAYER 2 (L2) MOBILITY PROTOCOL

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 17/234,406

(22) Filed: Apr. 19, 2021

(65) Prior Publication Data
US 2021/0328710 A1    Oct. 21, 2021

Related U.S. Application Data

(60) Provisional application No. 63/013,491, filed on Apr. 21, 2020.

(51) Int. Cl.
| | |
|---|---|
| *H04L 1/00* | (2006.01) |
| *H04W 28/04* | (2009.01) |
| *H04W 72/23* | (2023.01) |

(52) U.S. Cl.
CPC ........... *H04L 1/0013* (2013.01); *H04W 28/04* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2019/0007163 A1* | 1/2019 | Sun | ........................ H04L 5/0094 |
| 2019/0068348 A1 | 2/2019 | Nam | |

(Continued)

FOREIGN PATENT DOCUMENTS

WO    2020069415 A1    4/2020

OTHER PUBLICATIONS

Huawei, et al., "Views on Beam-based Mobility in NR", 3GPP TSG RAN WG1 Meeting #97, 3GPP Draft, R1-1907543, 3rd Generation Partnership Project (3GPP), Mobile Competence Centre, 650, Route Des Lucioles, F-06921 Sophia-Antipolis Cedex, France, vol. RAN WG1, No. Reno, USA, May 13-May 17, 2019, 4 Pages, May 13, 2019 (May 13, 2019), XP051728976, Retrieved from the Internet: URL: https://www.3gpp.org/ftp/tsg_ran/WG1_RL1/TSGR1_97/Docs/ [retrieved on May 13, 2019], 2.2 QCL Signaling Enhancements for Beam Management, Section 2.

(Continued)

*Primary Examiner* — Jeffrey M Rutkowski
*Assistant Examiner* — Mehedi S Aley
(74) *Attorney, Agent, or Firm* — Patterson & Sheridan, LLP

(57) ABSTRACT

Certain aspects of the subject matter described in this disclosure can be implemented in a method for wireless communication by a user equipment (UE). The method generally includes receiving layer 1 (L1) or layer 2 (L2) signaling indicating one or more selected physical cell identifiers (PCIs) of a group of PCIs for serving the UE; receiving an indication of a rule to be used for determining a configuration for rate matching around unavailable resources of a channel to be received via one or more cells associated with the one or more selected PCIs; determining the configuration for the rate matching based on the rule; and receiving the channel via the one or more cells in accordance with the determination.

26 Claims, 9 Drawing Sheets

(56) References Cited

U.S. PATENT DOCUMENTS

| | | | |
|---|---|---|---|
| 2019/0075553 A1* | 3/2019 | Sun | H04L 1/0067 |
| 2020/0107209 A1* | 4/2020 | Ratasuk | G01S 5/0236 |
| 2021/0136800 A1* | 5/2021 | Li | H04L 27/0006 |
| 2021/0329512 A1* | 10/2021 | Jassal | H04W 36/0058 |
| 2022/0070901 A1* | 3/2022 | Muruganathan | H04L 5/0094 |
| 2022/0149997 A1* | 5/2022 | Wang | H04L 1/1864 |
| 2022/0232496 A1* | 7/2022 | Kim | H04W 48/16 |
| 2022/0346128 A1* | 10/2022 | Ko | H04L 1/00 |
| 2023/0119744 A1* | 4/2023 | Lin | H04L 5/001 |
| | | | 370/329 |

OTHER PUBLICATIONS

International Search Report and Written Opinion—PCT/US2021/028117—ISA/EPO—dated Jul. 7, 2021.

\* cited by examiner

RATE MATCHING FOR LAYER 1 (L1) OR LAYER 2 (L2) MOBILITY PROTOCOL

CROSS-REFERENCE TO RELATED APPLICATION(S)

This application claims benefit of and priority to U.S. Provisional Application No. 63/013,491 filed Apr. 21, 2020, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for rate matching.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved rate matching techniques.

Certain aspects of the subject matter described in this disclosure can be implemented in a method for wireless communication by a user equipment (UE). The method generally includes receiving lower layer signaling indicating one or more selected physical cell identifiers (PCIs) of a group of PCIs for serving the UE; receiving an indication of a rule to be used for determining a configuration for rate matching around unavailable resources of a channel to be received via one or more cells associated with the one or more selected PCIs; determining the configuration for the rate matching based on the rule; and receiving the channel via the one or more cells in accordance with the determination.

Certain aspects of the subject matter described in this disclosure can be implemented in a method for wireless communication by a base station (BS). The method generally includes transmitting, to a UE, an indication of a rule to be used for determining a configuration for rate matching around unavailable resources of a channel, the channel to be transmitted via one or more cells associated with one or more selected PCIs of a group of PCIs configured using lower layer signaling to serve the UE; generating the channel in accordance with the configuration for rate matching; and transmitting the channel to the UE.

Certain aspects of the subject matter described in this disclosure can be implemented in an apparatus for wireless communication by a UE. The apparatus generally includes a memory and a processor, the memory and the processor being configured to: receive lower layer signaling indicating one or more selected PCIs of a group of PCIs for serving the UE; receive an indication of a rule to be used for determining a configuration for rate matching around unavailable resources of a channel to be received via one or more cells associated with the one or more selected PCIs; determine the configuration for the rate matching based on the rule; and receive the channel via the one or more cells in accordance with the determination.

Certain aspects of the subject matter described in this disclosure can be implemented in an apparatus for wireless communication by a BS. The apparatus generally includes a memory and a processor, the memory and the processor being configured to: transmitting, to a UE, an indication of a rule to be used for determining a configuration for rate matching around unavailable resources of a channel, the channel to be transmitted via one or more cells associated with one or more selected PCIs of a group of PCIs configured using lower layer signaling to serve the UE; generating the channel in accordance with the configuration for rate matching; and transmitting the channel to the UE.

Certain aspects of the subject matter described in this disclosure can be implemented in an apparatus for wireless communication by a UE. The apparatus generally includes: means for receiving lower layer signaling indicating one or more selected PCIs of a group of PCIs for serving the UE; means for receiving an indication of a rule to be used for determining a configuration for rate matching around unavailable resources of a channel to be received via one or more cells associated with the one or more selected PCIs; means for determining the configuration for the rate matching based on the rule; and means for receiving the channel via the one or more cells in accordance with the determination.

Certain aspects of the subject matter described in this disclosure can be implemented in an apparatus for wireless communication by a BS. The apparatus generally includes: means for transmitting, to a UE, an indication of a rule to be used for determining a configuration for rate matching around unavailable resources of a channel, the channel to be transmitted via one or more cells associated with one or more selected PCIs of a group of PCIs configured using lower layer signaling to serve the UE; means for generating the channel in accordance with the configuration for rate matching; and means for transmitting the channel to the UE.

Certain aspects of the subject matter described in this disclosure can be implemented in a computer-readable medium having instructions stored thereon to cause a UE to: receive lower layer signaling indicating one or more selected PCIs of a group of PCIs for serving the UE; receive an indication of a rule to be used for determining a configuration for rate matching around unavailable resources of a channel to be received via one or more cells associated with the one or more selected PCIs; determine the configuration for the rate matching based on the rule; and receive the channel via the one or more cells in accordance with the determination.

Certain aspects of the subject matter described in this disclosure can be implemented in a computer-readable medium having instructions stored thereon to cause a BS to: transmit, to a UE, an indication of a rule to be used for determining a configuration for rate matching around unavailable resources of a channel, the channel to be transmitted via one or more cells associated with one or more selected PCIs of a group of PCIs configured using lower layer signaling to serve the UE; generate the channel in accordance with the configuration for rate matching; and transmit the channel to the UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
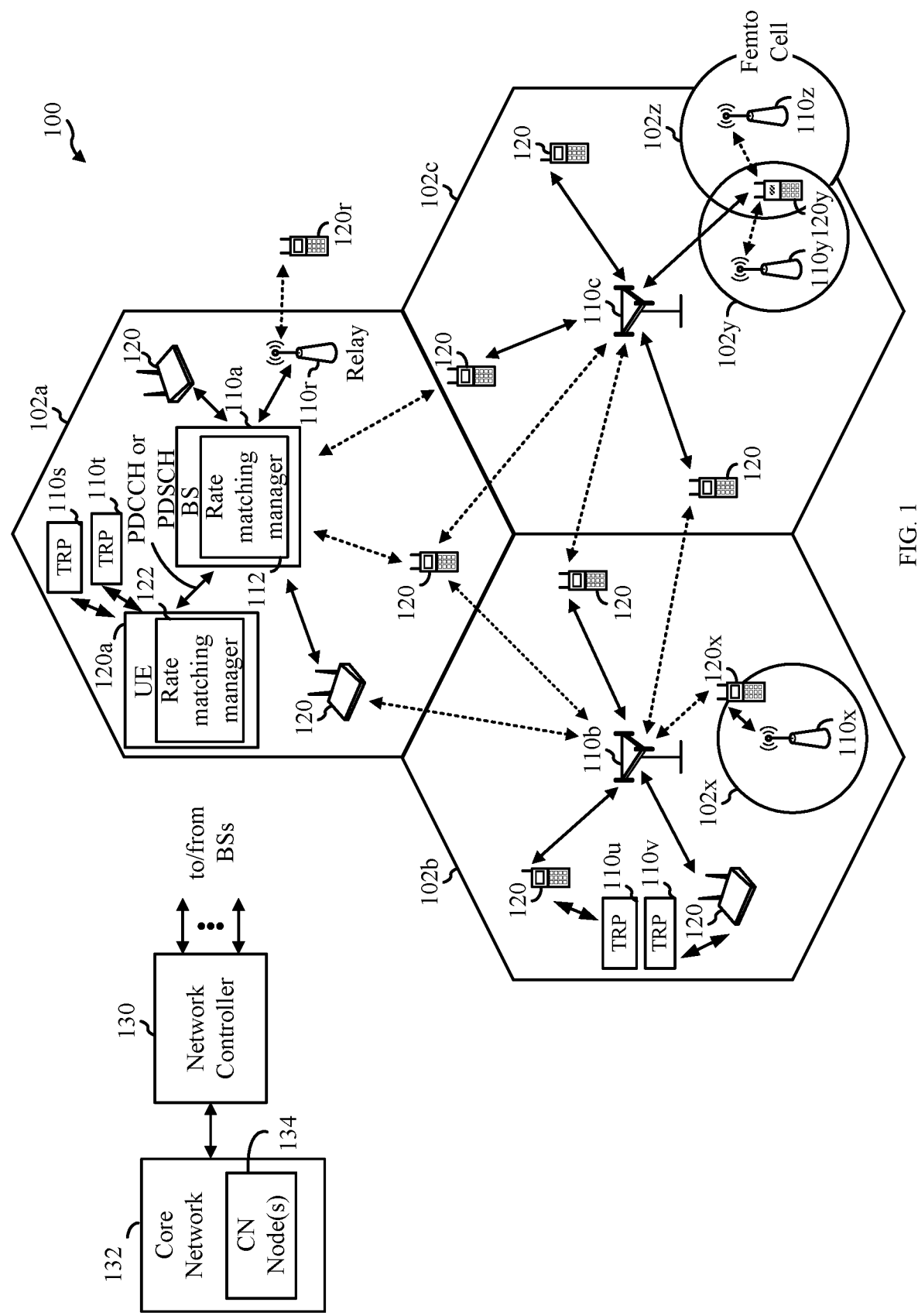
FIG. 1 is a block diagram conceptually illustrating an example telecommunications system, in accordance with certain aspects of the present disclosure.

Aspects of the present disclosure provide apparatus, methods, processing systems, and computer readable mediums for rate matching. As used herein, rate matching around a resource or resources generally refers to skipping the decoding of the resource(s). Certain aspects of the present disclosure provide techniques for rate matching for a layer 1 (L1) or layer 2 (L2) inter-cell mobility implementations. For example, L1 or L2 signaling, such as downlink control information (DCI) or medium access control (MAC)-control element (CE), may be used to configure one or more physical cell identifiers (PCIs) of a group of PCIs for serving a user equipment (UE). Resources for transmission of one or more SSBs (e.g., of a PCI, a subset of PCIs, or the entire group of PCIs) may overlap with resources for transmission and reception on a channel, causing interference when decoding the channel. Some aspects of the present disclosure provide techniques for reducing such interference. For example, in some aspects, a UE may be configured with rules that allow for rate matching around the SSBs when attempting to decode a transmission on the channel. Various rules may be provided for the UE to determine resources to be rate matched around when decoding the channel (e.g., a control channel or a data channel). Depending on a rate match rule selected by the UE, the UE may rate match around resources for the channel that overlap with synchronization signal block (SSB) transmission(s) of a PCI, a subset of PCIs, or the entire group of PCIs, as described in more detail herein.

The following description provides examples of rate matching in communication systems Changes may be made in the function and arrangement of elements discussed. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe. NR supports beamforming and beam direction may be dynamically configured. MIMO transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more base station (BSs) 110 and/or UEs 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

Multiple TRPs 110s-v may be implemented, which may be included for each cell, or for multiple cells. For example, each cell may have multiple TRPs to improve communication coverage. The TRPs may be located at different locations, and each TRP may have a different PCI. For example, the PCI for each TRP may be carried by a synchronization signal block (SSB) transmitted from the corresponding TRP. Each TRP may indicate, to a UE, the resources for transmission of SSBs for the PCIs associated with the cell.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for rate matching. As shown in FIG. 1, the BS 110a includes a rate matching manager 112. The rate matching manager 112 may be configured to select a rule for rate matching, and indicate the selected rule to a UE, in accordance with certain aspects of the present disclosure. As shown in FIG. 1, the UE 120a includes a rate matching manager 122. The rate matching manager 122 may be configured to select a rule for rate matching, and decode a data channel in accordance with the rate matching rule, in accordance with certain aspects of the present disclosure.

In FIG. 1, a solid line with double arrows indicates desired transmissions between a UE and a serving BS, which is a BS designated to serve the UE on the DL and/or uplink (UL). A finely dashed line with double arrows indicates interfering transmissions between a UE and a BS.

Figure 2:
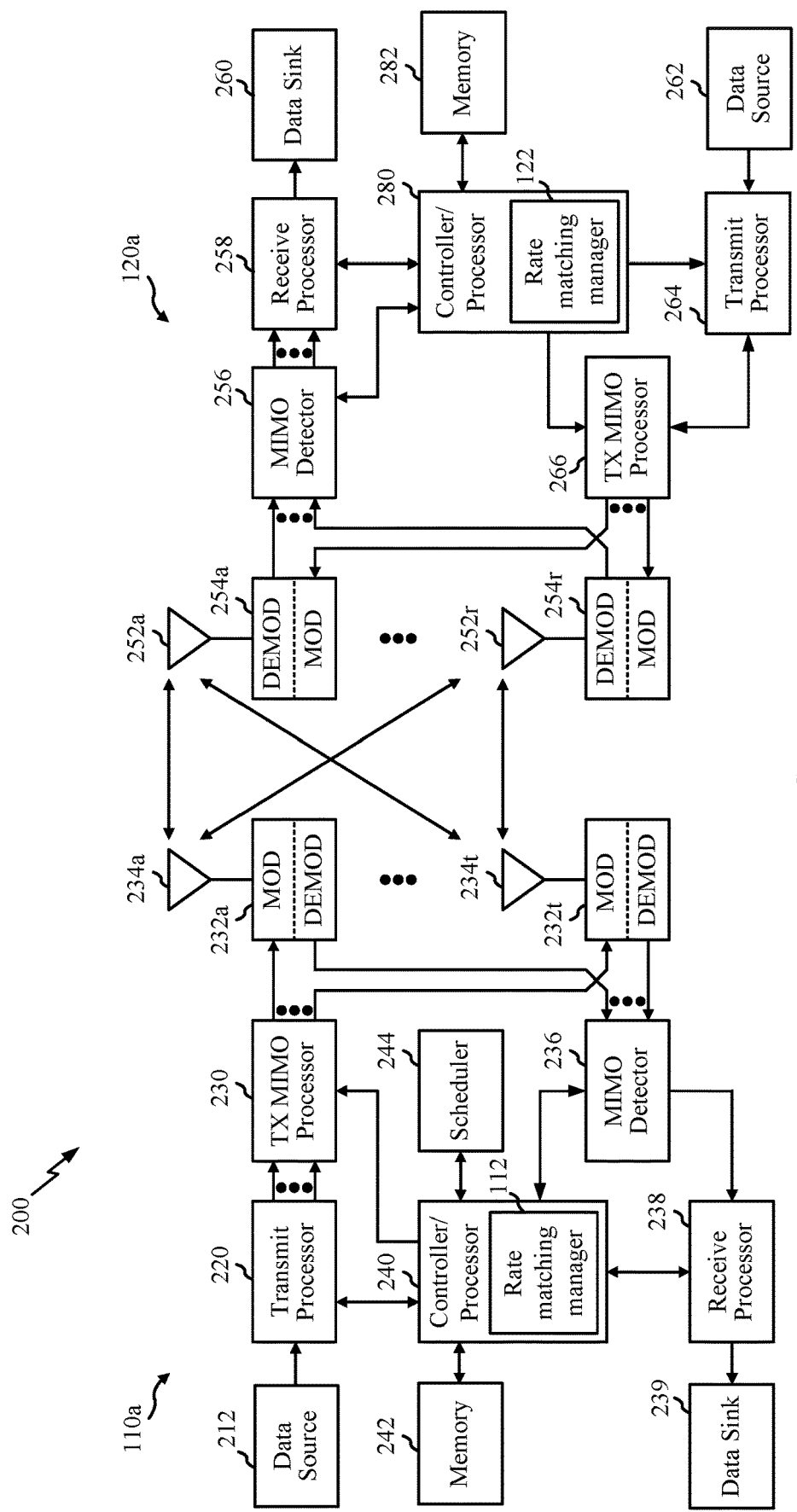
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a DL signal. DL signals from modulators in transceivers 232a-232t may be transmitted via the antennas 234a-234t, respectively.

At the UE 120a, the antennas 252a-252r may receive the DL signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the UL, at UE 120a, a transmit processor 264 may receive and process data (e.g., for the PUSCH) from a data source 262 and control information (e.g., for the physical uplink control channel (PUCCH) from the controller/processor 280. The transmit processor 264 may also generate reference symbols for a reference signal (RS) (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the UL signals from the UE 120a may be received by the antennas 234, processed by the modulators in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the DL and/or UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has the rate matching manager 112, according to certain aspects described herein. As shown in FIG. 2, the controller/processor 280 of the UE 120a has the rate matching manager 122, according to certain aspects described herein. Although shown at the controller/processor, other components of the UE 120a and BS 110a may be used to perform the operations described herein.

NR may utilize OFDM with a cyclic prefix (CP) on the UL and DL. NR may support half-duplex operation using time division duplexing (TDD). OFDM and single-carrier frequency division multiplexing (SC-FDM) may partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Figure 3:
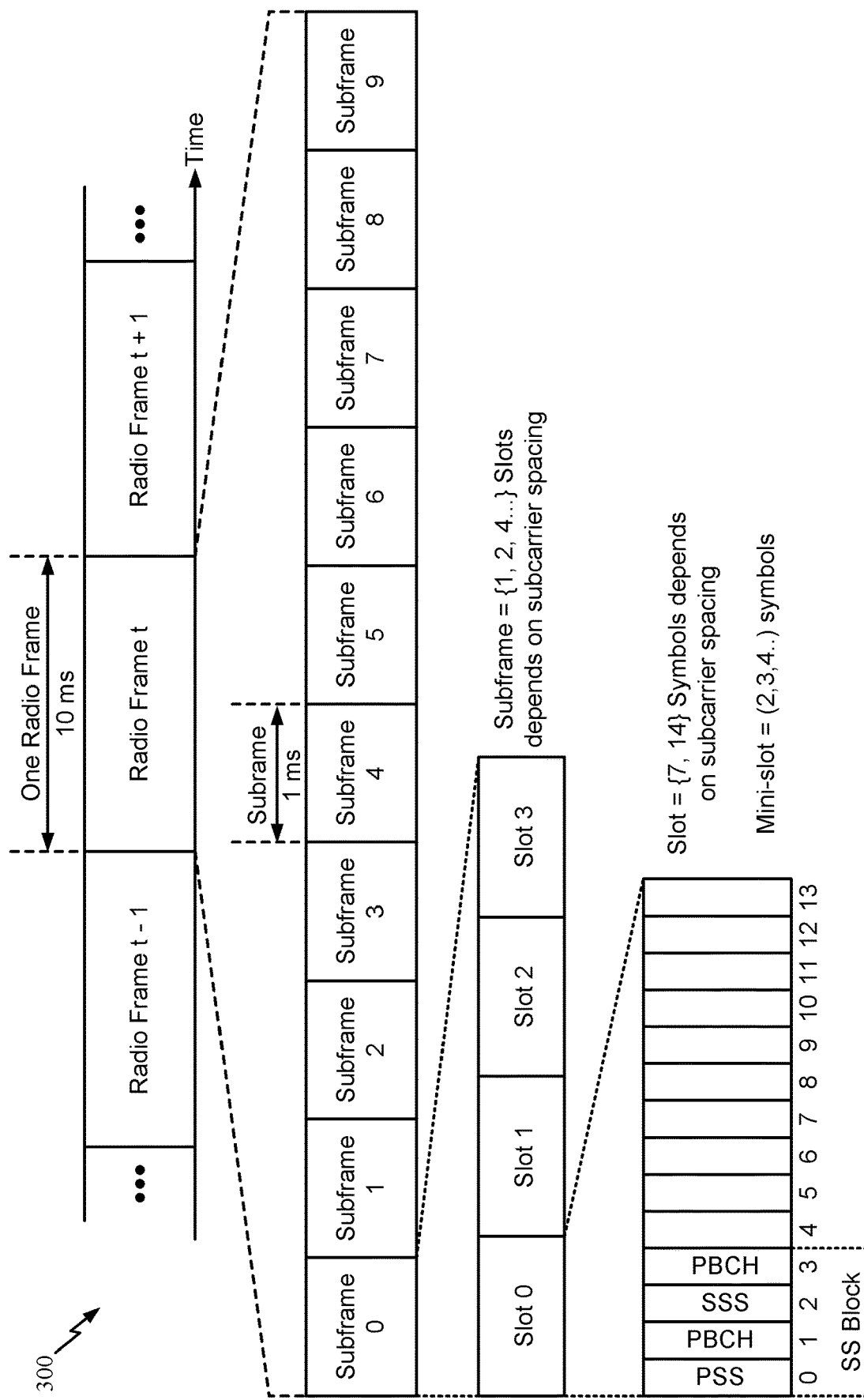
FIG. 3 is an example frame format for new radio (NR), in accordance with certain aspects of the present disclosure.

FIG. 3 is a diagram showing an example of a frame format 300 for NR. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval (TTI) having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Techniques for Rate Matching for Layer 1 (L1)/Layer 2 (L2) Intercell Mobility As used herein, a base station (BS) may support one or multiple cells, where a cell refers to a communication coverage area. In certain implementations, each cell (e.g., cell 102a shown in FIG. 1) may be used to serve a user equipment (UE) and have a single physical layer (PHY) cell ID (PCI). The PCI may be carried (e.g., indicated) by synchronization signal blocks (SSBs) from a cell. As used herein, a PCI may be any PCI from a serving cell (e.g., cell 102a serving UE 120a in FIG. 1) or non-serving cell (e.g., cell 102b may be a non-serving cell of UE 120a in FIG. 1). The PCI may be indicated by SSBs transmitted on a serving or non-serving cell. For reception of a channel (e.g., physical downlink control channel (PDCCH) or physical downlink shared channel (PDSCH)) in a cell, a user equipment (UE) may rate match around unavailable resources indicated for the cell. As used herein, to rate match around a resource generally refers to skipping decoding of the resources. In other words, certain resources may be indicated as unavailable, and if the indicated unavailable resources overlap with resources for the channel, the UE may rate match around (e.g., not receive or decode) the unavailable or overlapping resources when receiving the channel.

In some cases, the UE may determine a configuration for rate matching based on an indication from a base station (BS). For example, for a PDSCH that is scheduled by a control channel (e.g., physical downlink control channel (PDCCH)) scrambled with a system information (SI)-radio network temporary identifier (RNTI) and where an SI indicator in downlink control information (DCI) (e.g., on the PDCCH) is set to 0, the UE may determine, for purposes of performing rate matching, that no synchronization signal block (SSB) is transmitted in resource elements (REs) of the PDSCH. In other words, there may be no SSBs in the PDSCH assumed, and therefore, the UE may not perform any rate matching around SSBs in this case.

In some cases, for PDSCH scheduled by a PDCCH scrambled with SI-RNTI and where a system information indicator (e.g., in a system information block (SIB)) in the DCI is set to 1, or where the PDCCH is scrambled with a random access (RA)-RNTI, message B (MsgB)-RNTI, paging (P)-RNTI, or temporary cell (TC)-RNTI, then the UE may assume that the PDSCH REs overlapped with SSBs indicated by the BS (e.g., in ssb-PositionsInBurst) are not available. In other words, a portion of REs for PDSCH may be overlapped by SSBs. The UE may determine the position of the SSBs based on an indication from the BS. For example, the BS may provide an indication (e.g., ssb-PositionsInBurst) in an SSB intended for the UE, indicating to the UE the position of SSBs from the UE that the UE may rate match around when receiving the PDSCH. That is, the UE may not decode the SSBs that are considered to be unavailable resources in the scheduled resource pool of the PDSCH.

For PDSCH scheduled by PDCCH scrambled with a cell (C)-RNTI, a modulation and coding scheme (MCS)-C-RNTI, a configured scheduling (CS)-RNTI, or for a PDSCH with semi-persistent scheduling (SPS) (e.g., PDSCH configured using SPS), the UE may assume that PDSCH REs overlapped with SSBs indicated in ssb-PositionsInBurst are not available, and PDSCH REs corresponding to configured or dynamically indicated resources by rate matching pattern indicators are not available. The rate matching pattern indicators may be indicated by a BS to the UE and may include a rate matching pattern with resource block (RB)-symbol level granularity. In other words, the rate matching pattern may be indicated using an RB level unit in the frequency domain, and a symbol level unit in the time domain. Examples of rate matching patterns indicated with RB-symbol level granularity may include rateMatchPattern-Group1 or rateMatchPatternGroup2 which may be indicated in DCI, or RateMatchPattern(s) configured by radio resource control (RRC) messaging/signaling. For instance, rateMatchPatternGroup1 or rateMatchPatternGroup2 may be a list of RB and symbol level resource set indices forming a union of resource-sets not available for PDSCH dynamically if a corresponding bit of a rate matching indicator field of DCI scheduling the PDSCH is equal to 1. The RBs and symbols indicated by the rate matching patterns are determined to be unavailable in the scheduled resource pool of the PDSCH and rate matched around when receiving the PDSCH.

In certain aspects, the rate matching pattern indicator may include a rate matching pattern with RE level granularity. Generally, a rate matching pattern indicated with RE level granularity indicates unavailable resources in the resource pool of the channel that are used for reference signals (RSs). For example, the rate matching patterns that may be indicated with RE level granularity may include indications of RE positions for cell-specific reference signals (CRSs) such as RateMatchingPatternLTE-CRS (e.g., indicating a pattern of resources used for CRS for LTE), CRSPatternList-CORE-SETPoolIndex (e.g., indicating a pattern of resources used for multiple transmission-reception point (multi-TRP) transmissions that coexist with CRS for LTE), CRSPatternList-r16 (e.g., CRS pattern for release-16 of new radio (NR) standard). The rate matching patterns that may be indicated with RE level granularity may also include periodic (P), semi-persistent (SP), or aperiodic (AP) zero-power (ZP)-channel state information (CSI)-reference signal (RS) resources (e.g., P/ZP/AP ZP-CSI-RS resources) that may be configured, activated, or triggered by the BS. For example, the BS may configure ZP-CSI-RS indicating resources that are unavailable such that a UE avoids transmissions using those resources that may otherwise interfere with other wireless nodes.

Certain aspects of the present disclosure provide techniques for rate matching for an inter-cell mobility protocol. For example, multi-TRPs (e.g., such as TRPs 110s-v as shown in FIG. 1) may be implemented, which may be included for each cell, or for multiple cells. For example, each cell may have multiple TRPs to improve communication coverage. The TRPs may be located at different locations, and each TRP may have a different PCI. For example, the PCI for each TRP may be carried by SSB transmitted from the corresponding TRP. In other words, each TRP may indicate all the SSBs of the PCIs associated with the cell.

At each time, a UE may be served by a subset of a serving cell's PCIs. With time, the subset of the serving cell's PCIs that is serving the UE may change, as indicated to the UE via DCI or medium access control (MAC)-control element (CE) (e.g., layer 1 (L1) or layer 2 (L2) signaling). In other words, instead of using higher-level signaling for implementation of inter-cell mobility (e.g., mobility from one PCI to another), L1 or L2 signaling may be used to indicate such mobility (e.g., indicate the subset of PCIs serving the UE).

In some cases, the UE may be configured with a group of serving cells with a single PCI per serving cell. The UE may be configured to perform measurements of L1 metrics per serving cell in the group. The L1 metrics may include L1-reference signal receive power (RSRP), signal-to-interference-plus-noise ratio (SINR), or reference signal received quality (RSRQ). At each time, the UE may be served by a subset of the group of serving cells, which can be changed from time to time via DCI or MAC-CE, as described herein. The L1 metrics may be signaled to the BS via an L1 report, allowing the BS to decide the subset of the group of serving cells based on the L1 report from UE. The L1 report may be signaled to some selected serving cells or to an anchor serving cell in the group.

As described herein, a subset of PCI(s) of a group of PCIs may be configured to serve the UE, and this subset may be changed using L1/L2 signaling, as described herein. The subset of PCI(s) may be referred to herein as "one or more selected PCIs." Certain aspects of the present disclosure are generally directed to techniques for a UE to determine unavailable resources for rate matching when the UE is served by PCIs for an L1/L2 inter-cell mobility configuration where the subset of PCI(s) that serve a particular UE may be changed more rapidly than conventional inter-cell mobility implementations.

Figure 4:
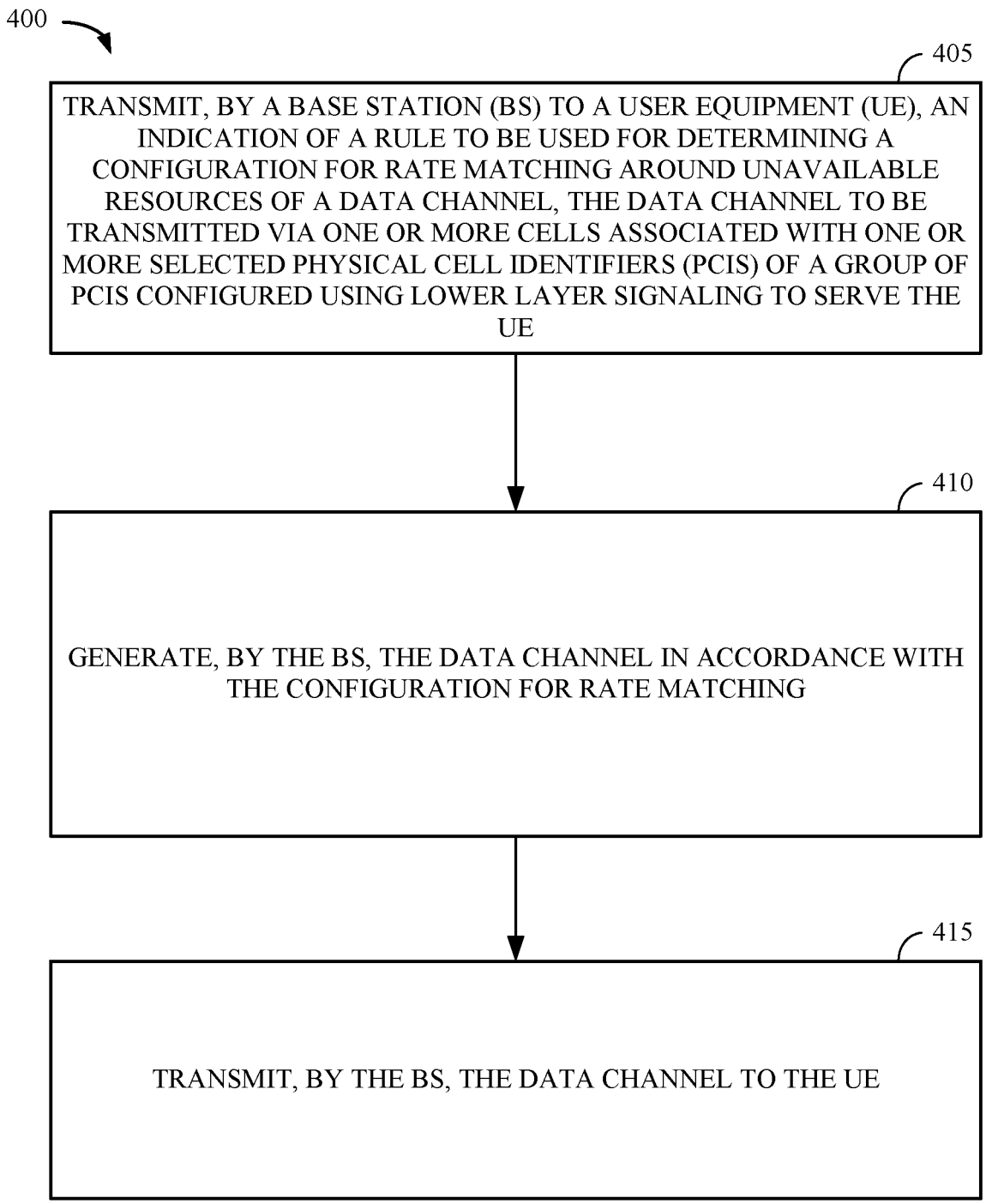
FIG. 4 is a flow diagram illustrating example operations for wireless communication by a BS, in accordance with certain aspects of the present disclosure.

FIG. 4 is a flow diagram illustrating example operations 400 for wireless communication, in accordance with certain aspects of the present disclosure. The operations 400 may be performed, for example, by a BS (e.g., such as the BS 110a in the wireless communication network 100).

Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400 may begin, at block 405, by the BS transmitting, to a UE, an indication of a rule to be used for determining a configuration for rate matching around unavailable resources of a channel. The channel may be a PDCCH or PDSCH. The channel may be transmitted via one or more cells associated with one or more selected PCIs of a group of PCIs configured using lower layer (e.g., layer 1 or layer 2) signaling to serve the UE. For example, DCI or MAC-CE may be transmitted to the UE via a PCI of the group of PCIs, indicating to the UE the one or more selected PCIs for the UE. At block 410, the BS generates the channel in accordance with the configuration for rate matching. At block 415, the BS transmits the channel to the UE.

Figure 5:
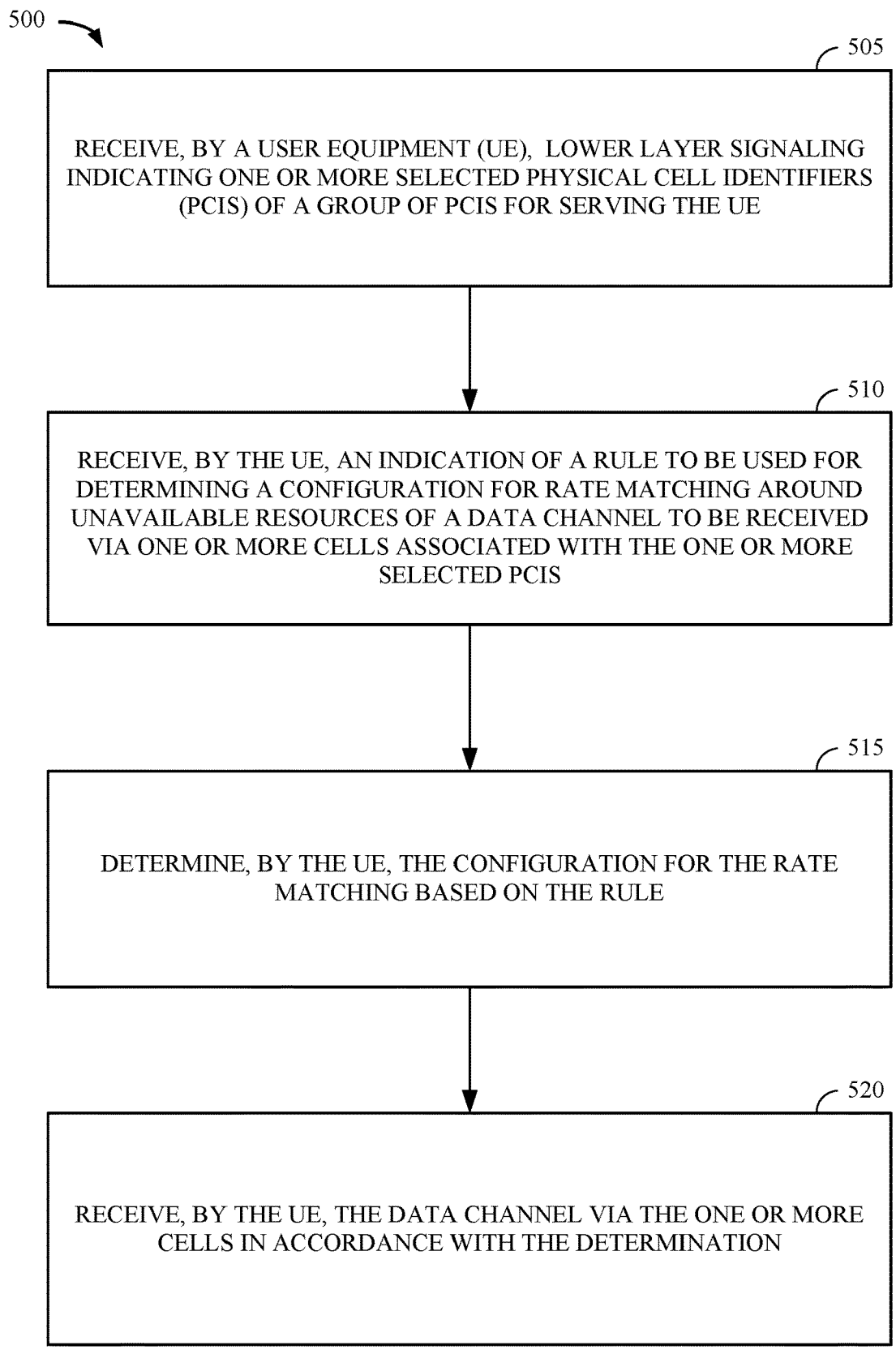
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., such as a UE 120a in the wireless communication network 100).

The operations 500 may be complementary operations by the UE to the operations 400 performed by the BS. Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, by the UE receiving lower layer signaling (e.g., DCI or MAC-CE) indicating one or more selected PCIs of a group of PCIs for serving the UE. For example, the group of PCIs may be associated with multiple TRPs of a cell, or the group of PCIs may be associated with multiple cells. At block 510, the UE receives an indication of a rule to be used for determining a configuration for rate matching around unavailable resources of a channel to be received via one or more cells associated with the one or more selected PCIs. The channel may be a PDCCH or PDSCH. At block 515, the UE determines the configuration for the rate matching based on the rule. At block 520, the UE receives the channel via the one or more cells in accordance with the determination.

For example, in certain aspects, the indication of the rule may include an indication to assume that resources of the channel are non-overlapping with SSB transmissions for the group of PCIs. In this case, the determination of the configuration for the rate matching at block 515 may include avoiding rate matching around the unavailable resources.

In certain aspects, the UE may also receive signaling indicating resources allocated for SSB transmissions for the group of PCIs. The indication of the rule may include an indication that at least a portion of resources of the channel that are overlapping with the SSB transmissions for the group of PCIs are the unavailable resources. Thus, the determination of the configuration for the rate matching at block 515 may include determining to rate match around the unavailable resources or the resources for the data channel overlapping with the SSB transmissions for the group of PCIs.

In certain aspects, the indication of the rule may include an indication that at least a portion of resources of the channel that are overlapping with at least one of the SSB transmissions for the one or more selected PCIs of the group of PCIs are the unavailable resources, and that the resources for the channel are non-overlapping with SSB transmissions for non-selected PCIs of the group of PCIs. Thus, the determination of the configuration for the rate matching at block 515 may include determining to rate match around the unavailable resources or the resources of the channel overlapping with the SSB transmissions for the one or more selected PCIs.

In certain aspects, the UE may also receive, via a cell associated with a PCI of the one or more selected PCIs, an indication scheduling resources for the channel. In this case, the indication of the rule may include an indication that at least a portion of the resources of the channel that are overlapping with at least one of the SSB transmissions via the cell scheduling the resources for the channel are the unavailable resources, and that the resources for the channel are non-overlapping with SSB transmissions for one or more other PCIs of the group of PCIs. Thus, the determination of the configuration for the rate matching at block 515 may include determining to rate match around the unavailable resources or the resources overlapping with the at least one of the SSB transmissions via the cell.

In certain aspects, the UE may receive signaling indicating unavailable resources associated with the group of PCIs. In this case, the indication of the rule comprises an indication that at least a portion of resources of the channel that are overlapping with the unavailable resources are not available. Thus, the determination of the configuration for the rate matching at block 515 may include determining to rate match around the resources of the channel that are not available or overlapped with the unavailable resources associated with the group of PCIs.

In certain aspects, the indication of the rule may include an indication that at least a portion of the resources of the channel that are overlapping with the unavailable resources for the one or more selected PCIs of the group of PCIs are not available, and that the resources for the channel are non-overlapping with the unavailable resources for non-selected PCIs of the group of PCIs. Thus, the determination of the configuration for the rate matching at block 515 may include determining to rate match around the resources of the channel that are not available or overlapped with the unavailable resources for the one or more selected PCIs.

In certain aspects, the UE may receive, via a cell associated with a PCI of the one or more selected PCIs, an indication scheduling the resources for the channel. In this case, the indication of the rule may include an indication that at least a portion of the resources of the channel that are overlapping with the unavailable resources associated with the cell scheduling the resources for the channel are unavailable, and that the resources for the channel are non-overlapping with the unavailable resources for one or more other PCIs of the group of PCIs. Thus, the determination of the configuration for the rate matching at block 515 may include determining to rate match around the resources of the channel that are not available or overlapped with the unavailable resources associated with the cell.

In certain aspects, the channel may be received via a PCI of the one or more selected PCIs, and the group of PCIs may include one or more configured sub-groups of PCIs. In this case, the UE may also receive signaling indicating unavailable resources associated with the sub-group of PCIs and determine at least one PCI sub-group of the configured sub-groups of PCIs that includes the one or more selected PCIs, one of the at least one PCI sub-group having the PCI via which the channel is received. The indication of the rule may include an indication that at least a portion of the resources of the channel that are overlapping with the unavailable resources associated with one of the at least one PCI sub-group are not available. Thus, the UE may determine the configuration for the rate matching at block 515 by determining to rate match around the resources of the channel that are not available or overlapped with the unavailable resources associated with one of the at least one PCI sub-group.

In certain aspects, the indication of the rule may include an indication that at least a portion of resources of the channel that are overlapping with the unavailable resources associated with the at least one PCI sub-group are not available. Thus, the determination of the configuration for the rate matching at block 515 may include determining to rate match around the resources of the channel that are not available or overlapped with the unavailable resources associated with the at least one PCI sub-group.

In certain aspects, multiple candidate rate matching patterns may be configured for the group of PCIs. In this case, the UE may receive signaling indicating one of the multiple candidate rate matching patterns, where one of the multiple candidate rate matching patterns indicates unavailable resources associated with the one or more selected PCIs. The indication of the rule may include an indication that at least a portion of the resources of the channel that are overlapping with the unavailable resources associated with the one or more selected PCIs are not available and that the resources for the channel are non-overlapping with unavailable resources for one or more other PCIs of the group of PCIs. Thus, the determination of the configuration for the rate matching at block 515 may include determining to rate match around the resources of the channel that are not available or overlapped with the unavailable resources associated with the one or more selected PCIs.

Figure 6A:
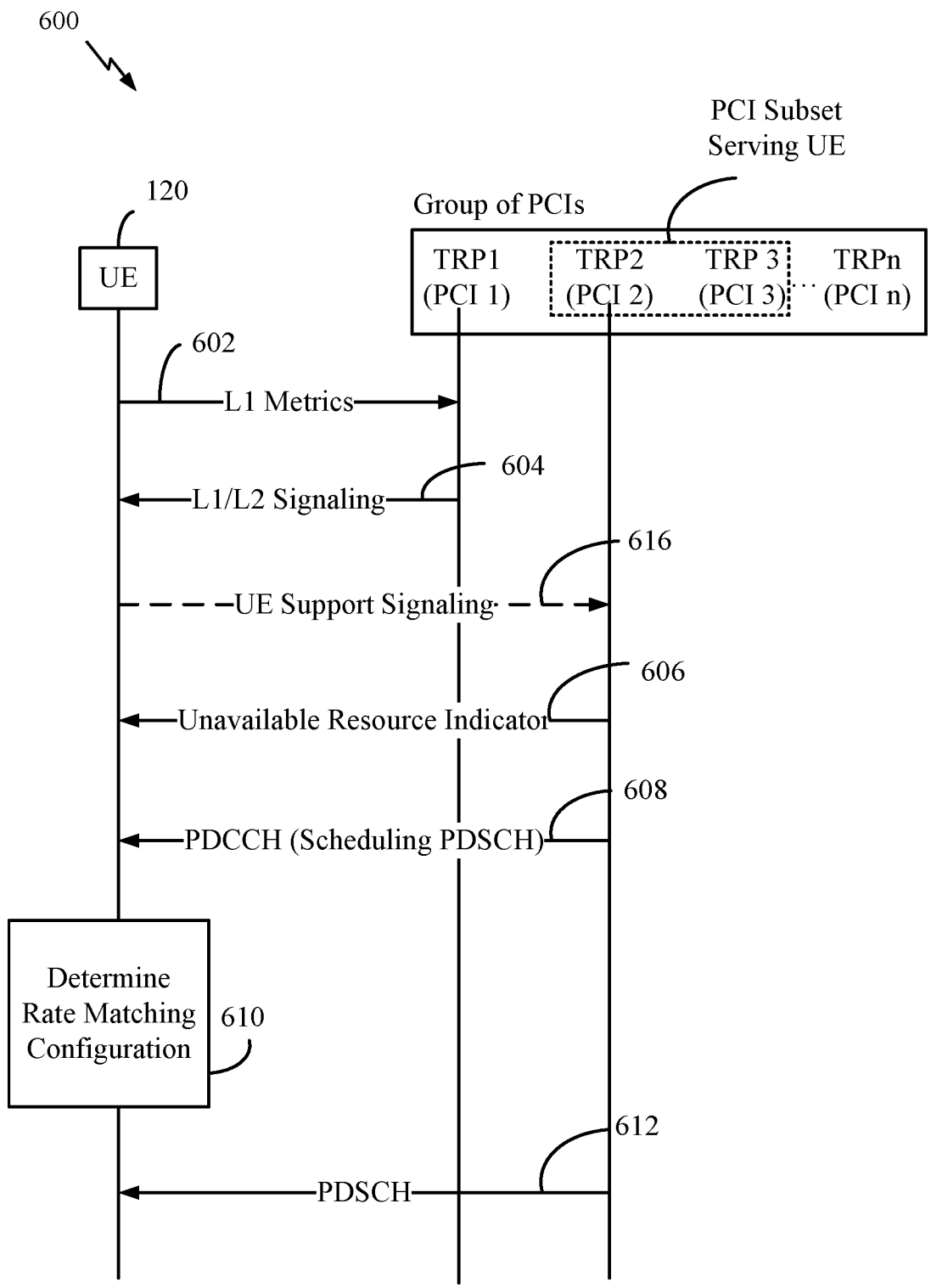
FIG. 6A illustrates a communication protocol for layer 1 (L1)/layer 2 (L2) inter-cell mobility with rate matching, in accordance with certain aspects of the present disclosure.

FIG. 6A illustrates a communication protocol 600 for L1/L2 inter-cell mobility with rate matching, in accordance with certain aspects of the present disclosure. As illustrated, a UE 120 may optionally indicate L1 metric(s) 602 to a BS via a cell associated with PCI 1. The BS may then use the L1 metric(s) to select a subset of PCI(s) (e.g., PCI 2 and PCI 3) to serve the UE 120 and indicate the selected PCIs to the UE. While the PCI subset serving the UE includes multiple PCIs in the example communication protocol 600, the PCI subset may include only a single PCI in some cases. The indication of the subset of PCIs to serve the UE 120 may be via L1 or L2 signaling 604, such as DCI or MAC-CE.

In certain aspects, UE 120 may optionally transmit an indication 616 of the UE's support for various rules that may be used to determine unavailable resources to be rate matched around when receiving a channel. UE 120's support for such rules may be considered when the BS indicates to UE 120 which of the candidate rules to use, as will be described in more detail herein.

Figure 6B:
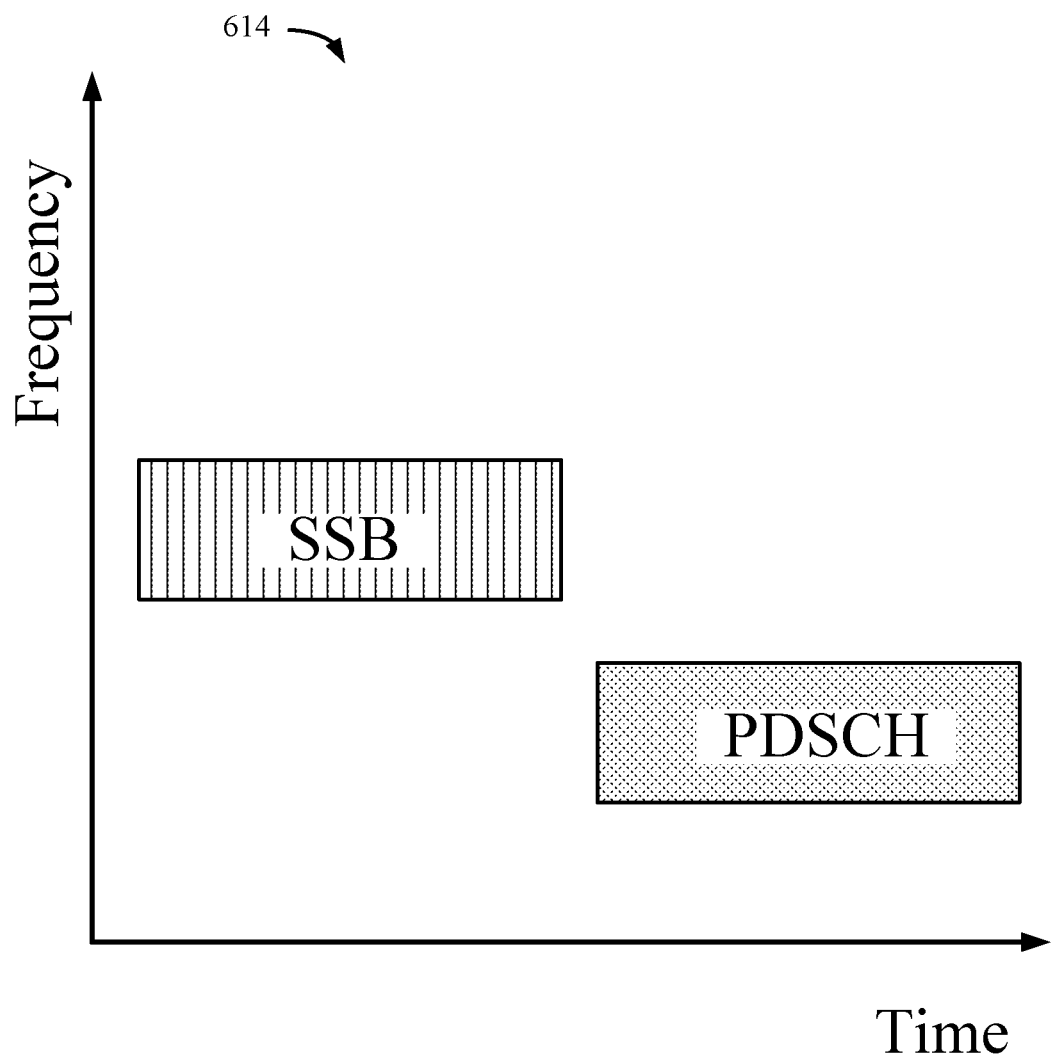
FIG. 6B illustrates non-overlapping resources used for a synchronization signal block (SSB) and transmission on a channel, in accordance with certain aspects of the present disclosure.

UE 120 may also receive a message 606 indicating unavailable resources. Message 606 may be a SSB, and the indication of the unavailable resources may be an indication (e.g., ssb-PositionsInBurst) of positions of SSB transmissions for the group of PCIs, as described in more detail herein. As shown in the time-frequency graph 614 of FIG. 6B, in some cases, message 606 may indicate resources of a channel (e.g., PDSCH) are non-overlapping with SSB transmissions for the group of PCIs.

UE 120 may then receive control signaling 608 (e.g., PDCCH) scheduling a PDSCH 612. UE 120 may then, at 610, determine a rate matching configuration for receiving the PDSCH 612.

The communication protocol 600 includes one or more steps or actions for performing rate matching. Certain steps and/or actions may be interchanged with one another. In other words, unless a specific order of steps or actions is specified, the order and/or use of specific steps and/or actions may be modified.

In certain aspects, the determination of the rate matching configuration, at block 610, may be based on an indication from the BS. For example, the rate matching configuration may be determined based on a type of RNTI scrambled with the control signaling 608 (e.g., PDCCH), as described in more detail herein. In certain aspects of the present disclosure, one or more rules may be provided for determining the rate matching configuration.

In certain aspects of the present disclosure, the unavailable resources to be potentially rate matched around may correspond to SSB transmissions. In other words, the subset of PCI(s) to serve UE 120 may be selected via L1/L2 signaling from a group of PCIs, and one or more rate matching rules may be configured for rate matching around resources for SSB transmissions by one or more PCIs of the group of PCIs.

For example, the one or more rate matching rules may include a first candidate rule (also referred to herein as "SSB rate matching rule 1"). In accordance with SSB rate matching rule 1, for a channel from one PCI (e.g., PCI 2), UE 120 may assume that no SSB from any PCI in the group is transmitted in REs of the PDSCH. In other words, UE 120 may determine (e.g., at block 610) that rate matching around resources is not needed when receiving the channel because UE 120 assumes that there are no SSB transmissions overlapping with the resources of the channel.

In certain aspects, the one or more rate matching rules may include a second candidate rule (also referred to herein as "SSB rate matching rule 2"). In accordance with the SSB rate matching rule 2, for a channel (e.g., PDSCH 612) from one PCI (e.g., PCI 2), UE 120 may assume the channel REs overlapped with SSBs indicated by the BS (e.g., via ssb-PositionsInBurst) for any PCI in the group of PCIs (e.g., PCIs 1 to PCI n) are unavailable.

In certain aspects, the one or more rate matching rules may include a third candidate rule (e.g., also referred to herein as "SSB rate matching rule 3"). In accordance with SSB rate matching rule 3, for a channel (e.g., PDSCH 612) from one PCI (e.g., PCI 2), the UE may assume the channel's REs overlapped with SSBs indicated by the BS (e.g., via ssb-PositionsInBurst) for any PCI in the selected subset (e.g., PCI 2 and PCI 3) are not available.

In certain aspects, the one or more rules may include a fourth candidate rule (e.g., also referred to herein as "SSB rate matching rule 4"). In accordance with SSB rate matching rule 4, for a channel (e.g., PDSCH 612) from one PCI (e.g., PCI 2), UE 120 may assume that the channel REs overlapped with SSBs indicated by the BS (e.g., in ssb-PositionsInBurst) for the PCI (e.g., PCI 2) of the cell scheduling the channel are not available.

A channel from one PCI (also referred to as a channel being associated with a PCI) generally refers to the TCI state or QCL information for the channel being associated with the PCI. For instance, a QCL source RS for the channel indicated by the TCI state may be the SSB transmitted with the PCI. The PCI may be indicated by the PSS or the SSS of the SSB.

As described herein, the rule to be used for determining the rate matching configuration may be indicated by the BS. For example, UE 120 may choose a different rule based on RNTI and other indicators for the scheduling PDCCH (e.g., control signaling 608). For example, for PDSCH scheduled by PDCCH scrambled with SI-RNTI, and where the SI indicator in the DCI (e.g., of the PDCCH) is set to 0, UE 120 may choose SSB rate matching rule 1 (e.g., assume that no SSB from any PCI in the group is transmitted in REs of PDSCH, as described herein). In other words, the determination of the rate matching configuration may be based on the RNTI with which the PDCCH is scrambled and a logic state of the SI indicator.

As another example, for PDSCH scheduled by PDCCH scrambled with SI-RNTI and where the SI indicator in the DCI is set to 1, or when the PDCCH is scrambled with RA-RNTI, MsgB-RNTI, P-RNTI, TC-RNTI, UE 120 may choose SSB rate matching rule 2 (e.g., assume that PDSCH REs overlapped with SSBs indicated by the BS (e.g., via ssb-PositionsInBurst) for any PCI in the group of PCIs (e.g., PCIs 1 to PCI n) are unavailable.

In certain aspects, UE 120 may indicate whether UE 120 supports each of the candidate rules, as described herein. For example, as illustrated in FIG. 6, UE 120 may transmit an indication 616 of UE 120's support (e.g., capability) for the candidate rules, and the selection by the BS of the rule to be applied for rate matching may be in accordance with UE 120's indicated support. For example, UE 120 may be indicated to use SSB rate matching rule 4, where UE 120 supports SSB rate matching rule 4. Otherwise, SSB rate matching rule 2 or SSB rate matching rule 3 may be used.

In certain aspects of the present disclosure, UE 120 may determine resources of the channel (e.g., PDSCH 612) to rate match around based on an indication of unavailable resources from the BS. For example, suppose the subset of PCI(s) to serve UE 120 is selected via L1/L2 signaling from a group of PCIs, as described herein. One or more candidate rate matching rules for the indicated unavailable resources may be configured.

In certain aspects, the one or more candidate rules may include a first unavailable resource rate matching rule (also referred to herein as "unavailable resource rate matching rule 1"). In accordance with the unavailable resource rate matching rule 1, for a channel (e.g., PDSCH 612) from one PCI (e.g., PCI 2), UE 120 may assume the channel's REs overlapped with indicated unavailable resources for any PCI in the group of PCIs (e.g., PCI 1 to PCI n) are unavailable. Thus, UE 120 may rate match around the unavailable resources when receiving the channel.

In certain aspects, the one or more candidate rules may include a second unavailable resource rate matching rule (also referred to herein as "unavailable resource rate matching rule 2"). In accordance with the unavailable resource rate matching rule 2, for a channel (e.g., PDSCH 612) from one PCI (e.g., PCI 2), UE 120 may assume the channel's REs overlapped with indicated unavailable resources for any PCI in the selected subset (e.g., PCI 2 and PCI 3) are unavailable.

In certain aspects, the one or more candidate rules may include a third unavailable resource rate matching rule (also referred to herein as "unavailable resource rate matching rule 3"). In accordance with the unavailable resource rate matching rule 3, for a channel (e.g., PDSCH 612) from one PCI (e.g., PCI 2), the UE may assume the channel's REs overlapped with indicated unavailable resources for the PCI (e.g., PCI 2) of the cell scheduling the channel are unavailable.

In certain aspects, the one or more candidate rules may include a fourth unavailable resource rate matching rule (also referred to herein as "unavailable resource rate matching rule 4"). In certain aspects, a rate matching pattern may be configured (e.g., pre-configured) for each candidate sub-group of PCIs (e.g., instead of a rate matching pattern being configured per PCI). In accordance with the unavailable resource rate matching rule 4, where the selected subset of PCIs (e.g., selected by the BS and indicated to the UE using L1 or L2 signaling) contains at least one sub-group of PCIs, then the UE may apply the rate matching pattern for that sub-group of PCIs. For instance, for a channel (e.g., PDSCH 612) from one PCI (e.g., PCI 2), UE 120 may assume that the channel's REs overlapped with indicated unavailable resources for the corresponding sub-group of PCIs are not available. The corresponding sub-group of PCIs may be the subgroup of PCIs having the PCI (e.g., PCI 2) via which the channel is transmitted. As another example, in accordance with the unavailable resource rate matching rule 4, for the channel (e.g., PDSCH 612) from one PCI (e.g., PCI 2), UE 120 may assume that the channel's REs overlapped with indicated unavailable resources for any sub-group of PCIs in the selected subset of PCIs are not available.

In certain aspects, the one or more candidate rules may include a fifth unavailable resource rate matching rule (also referred to herein as "unavailable resource rate matching rule 5"). In certain aspects, the BS may configure (e.g., pre-configure) multiple candidate rate matching patterns for the group of PCIs for L1/L2 inter-cell mobility. In this case, the candidate rate matching patterns may not be associated with any PCI or PCI sub-group. In accordance with the unavailable resource rate matching rule 5, for each selected subset of PCIs, the BS may dynamically indicate a subset of patterns among the candidate patterns via DCI, MAC-CE, or RRC signaling. The indicated subset of patterns may indicate the unavailable resources associated with the selected subset of PCIs, and UE 120 may rate match around resources for the channel (e.g., PDSCH 612) that overlap with the unavailable resources associated with the selected subset of PCIs.

In certain aspects, UE 120 may receive an indication of the unavailable resources (e.g., via message 606, as described with respect to FIG. 6). For example, the indication of the unavailable resources may be a rate matching pattern with RB-symbol level granularity. In other words, the rate matching pattern may be indicated with RB level granularity in the frequency domain, and symbol level granularity in the time domain, as described herein. Examples of rate matching patterns with RB-symbol level granularity include rateMatchPatternGroup1 or rateMatchPatternGroup2 indicated in DCI, and rateMatchPattern(s) configured by RRC, as described herein. In some cases, the rate matching pattern indicated to UE 120 may be with RE level granularity (e.g., having RE level granularity in the frequency domain, and symbol level granularity in the time domain). Examples of rate matching patterns with RE level granularity include RateMatchingPatternLTE-CRS, CRSPatternList-CORESETPoolIndex, CRSPatternList-r16, and P/SP/AP ZP-CSI-RS resources configured/activated/triggered by the BS (e.g., gNB), as described herein.

In certain aspects, UE 120 may select one of the candidate rules, based on an indication from the BS, and apply a rate matching configuration accordingly. For example, one of the candidate rules may be chosen based on RNTI and other indicators for a scheduling PDCCH. For example, for PDSCH scheduled by PDCCH scrambled with C-RNTI, MCS-C-RNTI, CS-RNTI, or PDSCH with SPS, unavailable resource rate matching rule 3 may be used.

In certain aspects, UE 120 may indicate whether UE 120 supports each of the candidate rules. For example, if UE 120 indicates support for the unavailable resource rate matching rule 3, the BS may select and indicate to UE 120 to use unavailable resource rate matching rule 3 for rate matching. Otherwise, UE 120 may be indicated to use the unavailable resource rate matching rule 1 or 2.

Example Wireless Communications Devices

Figure 7:
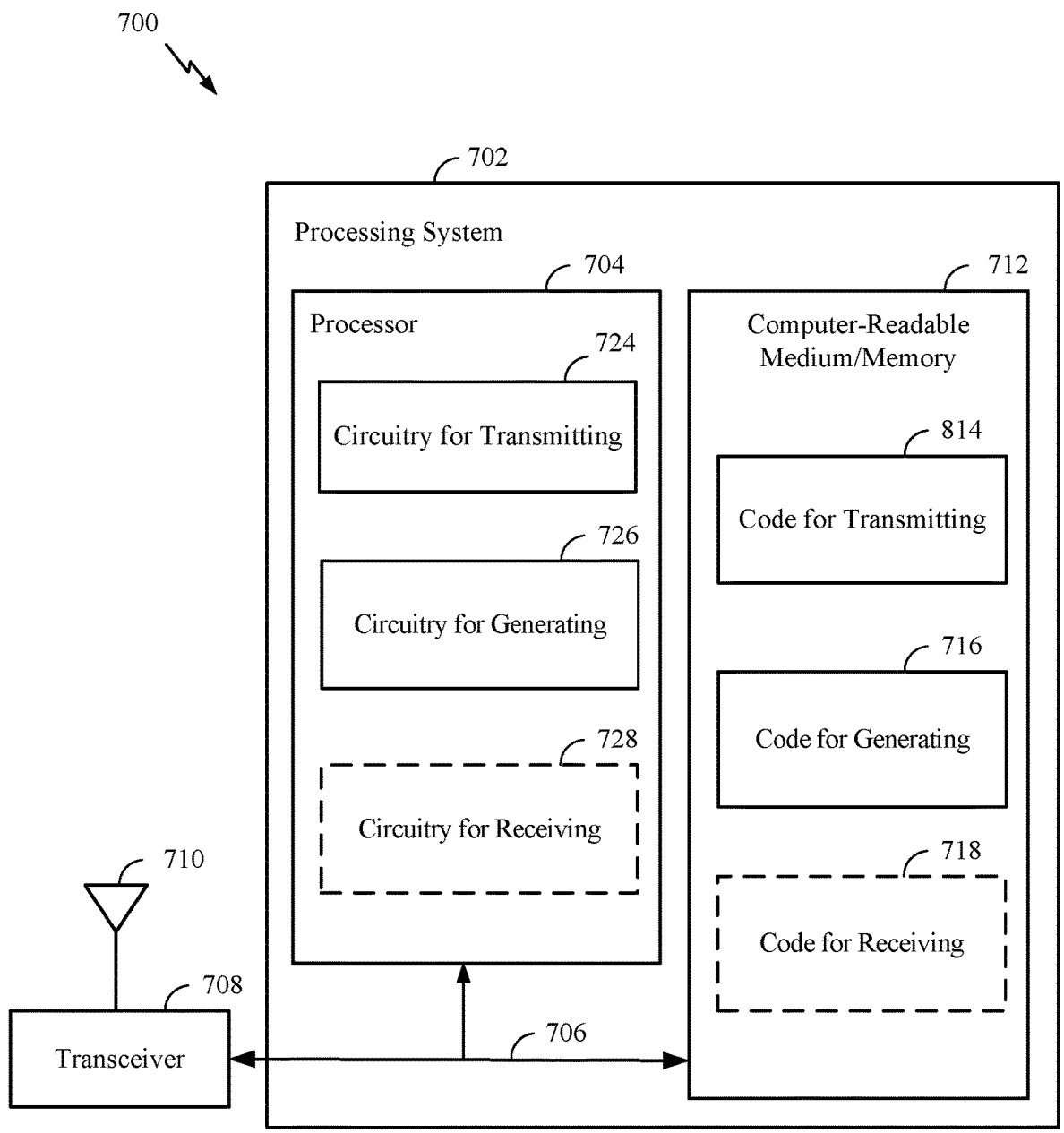
FIG. 7 illustrates a communications device that may include various components configured to perform operations for the techniques disclosed herein, in accordance with aspects of the present disclosure.

FIG. 7 illustrates a communications device 700 that may include various components (e.g., corresponding to means-plus-function components) configured to perform operations for the techniques disclosed herein, such as the operations illustrated in FIGS. 4 and 6. In some examples, communications device 700 may be a base station (BS) 110*a* as described, for example with respect to FIGS. 1 and 2.

Communications device 700 includes a processing system 702 coupled to a transceiver 708 (e.g., a transmitter and/or a receiver). The transceiver 708 is configured to transmit (or send) and receive signals for the communications device 700 via an antenna 710, such as the various signals as described herein. The processing system 702 may be configured to perform processing functions for the communications device 700, including processing signals received and/or to be transmitted by the communications device 700.

Processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 4, or other operations for performing the various techniques discussed herein for rate matching. In certain aspects, computer-readable medium/memory 712 stores code 714 (e.g., an example of means for) for transmitting; code 716 (e.g., an example of means for) for generating; and optional code 718 (e.g., an example of means for) for receiving.

In certain aspects, the processor 704 has circuitry configured to implement the code stored in the computer-readable medium/memory 712. The processor 704 includes circuitry 724 (e.g., an example of means for) for receiving; circuitry 726 (e.g., an example of means for) for generating; and optional circuitry 728 (e.g., an example of means for) for receiving.

Various components of communications device 700 may provide means for performing the methods described herein, including with respect to FIGS. 4 and 6.

In some examples, means for transmitting or sending (or means for outputting for transmission) may include the transceivers 232 and/or antenna(s) 234 of the BS 110*a* illustrated in FIG. 2 and/or transceiver 708 and antenna 710 of the communications device 700 in FIG. 7.

In some examples, means for receiving (or means for obtaining) may include the transceivers 232 and/or antenna(s) 234 of the BS 110*a* illustrated in FIG. 2 and/or transceiver 708 and antenna 710 of the communication device 700 in FIG. 7.

In some examples, means for transmitting, means for generating, and means for receiving may include various processing system components, such as: the one or more processors 704 in FIG. 7, or aspects of the BS 110*a* depicted in FIG. 2, including receive processor 238, transmit processor 220, TX MIMO processor 230, and/or controller/processor 240 (including rate matching manager 112).

Notably, FIG. 7 is just one use example, and many other examples and configurations of communications device 700 are possible.

Figure 8:
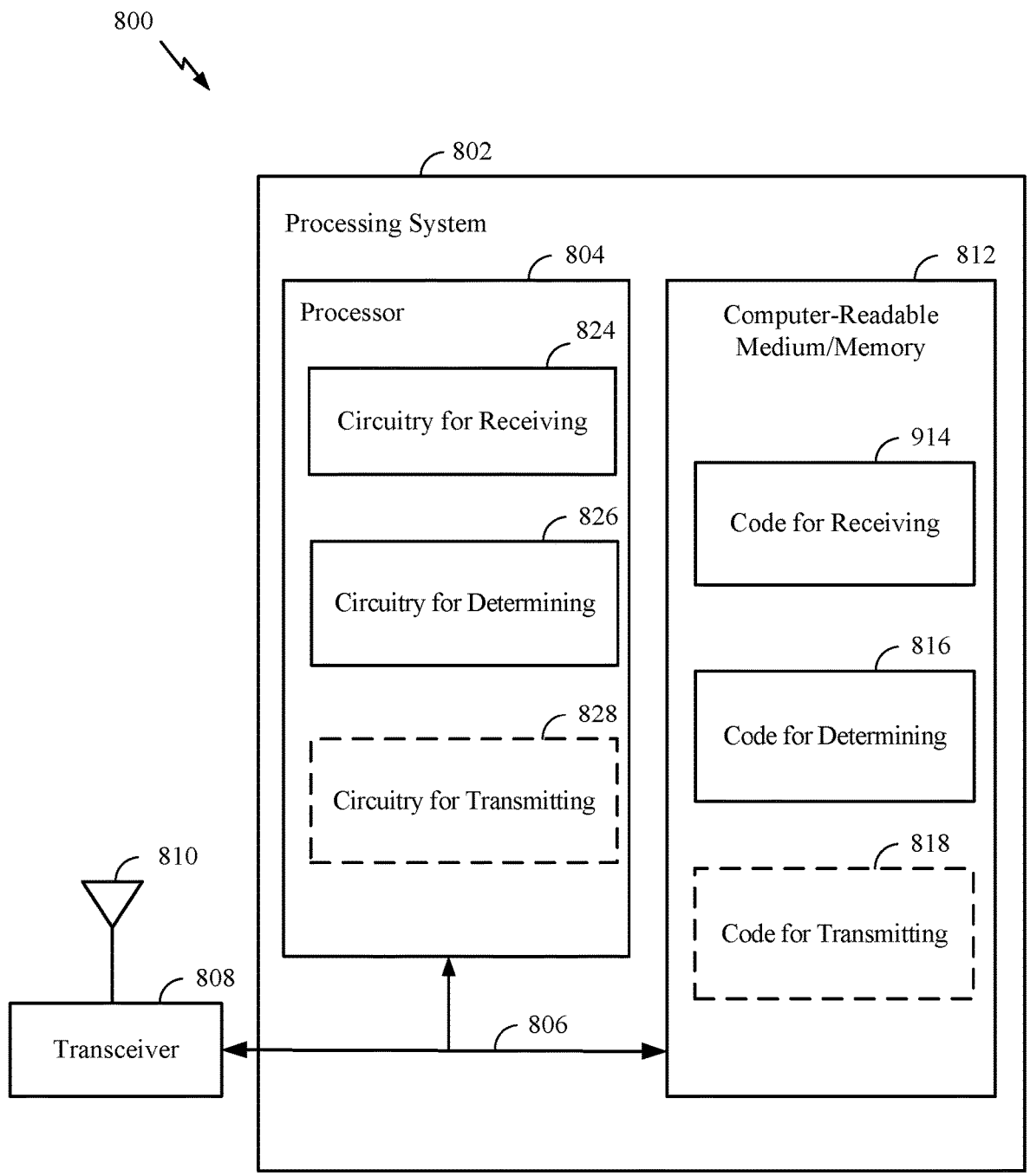
FIG. 8 illustrates a communications device that may include various components configured to perform operations for the techniques disclosed herein, in accordance with aspects of the present disclosure.

FIG. 8 illustrates a communications device 800 that may include various components (e.g., corresponding to means-plus-function components) configured to perform operations for the techniques disclosed herein, such as the operations illustrated in FIGS. 5 and 6. In some examples, communications device 800 may be a user equipment (UE) 120*a* as described, for example with respect to FIGS. 1 and 2.

Communications device 800 includes a processing system 802 coupled to a transceiver 808 (e.g., a transmitter and/or a receiver). The transceiver 808 is configured to transmit (or send) and receive signals for the communications device 800 via an antenna 810, such as the various signals as described herein. The processing system 802 may be configured to perform processing functions for the communications device 800, including processing signals received and/or to be transmitted by the communications device 800.

Processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 5, or other operations for performing the various techniques discussed herein for rate matching.

In certain aspects, computer-readable medium/memory 812 stores code 814 (e.g., an example of means for) for receiving; code 816 (e.g., an example of means for) for determining; and optional code 818 (e.g., an example of means for) for transmitting.

In certain aspects, the processor 804 has circuitry configured to implement the code stored in the computer-readable medium/memory 812. The processor 804 includes circuitry 824 (e.g., an example of means for) for receiving; circuitry 826 (e.g., an example of means for) for determining; and optional circuitry 828 (e.g., an example of means for) for transmitting.

Various components of communications device 800 may provide means for performing the methods described herein, including with respect to FIGS. 5 and 6.

In some examples, means for transmitting or sending (or means for outputting for transmission) may include the transceivers 254 and/or antenna(s) 252 of the UE 120a illustrated in FIG. 2 and/or transceiver 808 and antenna 810 of the communications device 800 in FIG. 8.

In some examples, means for receiving (or means for obtaining) may include the transceivers 254 and/or antenna(s) 252 of the UE 120a illustrated in FIG. 2 and/or transceiver 808 and antenna 810 of the communications device 800 in FIG. 8.

In some examples, means for receiving, means for determining, and means for transmitting may include various processing system components, such as: the one or more processors 804 in FIG. 8, or aspects of the UE 120a depicted in FIG. 2, including receive processor 258, transmit processor 264, TX MIMO processor 266, and/or controller/processor 280 (including rate matching manager 122).

Notably, FIG. 8 is just use one example, and many other examples and configurations of communications device 800 are possible.

The rate matching manager 112 or 122 may support wireless communication in accordance with examples as disclosed herein.

The rate matching manager 112 or 122 may be an example of means for performing various aspects described herein. The rate matching manager 112 or 122, or its sub-components, may be implemented in hardware (e.g., in uplink resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, the rate matching manager 112 or 122, or its sub-components, may be implemented in code (e.g., as configuration management software or firmware) executed by a processor, or any combination thereof. If implemented in code executed by a processor, the functions of the rate matching manager 112 or 122, or its sub-components may be executed by a general-purpose processor, a DSP, an ASIC, a FPGA or other programmable logic device.

In some examples, the rate matching manager 112 or 122 may be configured to perform various operations (e.g., receiving, generating, determining, transmitting) using or otherwise in cooperation with the transceiver 708 or 808.

The rate matching manager 112 or 122, or its sub-components, may be physically located at various positions, including being distributed such that portions of functions are implemented at different physical locations by one or more physical components. In some examples, the rate matching manager 112 or 122, or its sub-components, may be a separate and distinct component in accordance with various aspects of the present disclosure. In some examples, the rate matching manager 112 or 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses

Implementation examples are described in the following numbered clauses:

Clause 1. A method for wireless communication by a user equipment (UE), comprising: receiving lower layer signaling indicating one or more selected physical cell identifiers (PCIs) of a group of PCIs for serving the UE; receiving an indication of a rule to be used for determining a configuration for rate matching around unavailable resources of a channel to be received via one or more cells associated with the one or more selected PCIs; determining the configuration for the rate matching based on the rule; and receiving the channel via the one or more cells in accordance with the determination.

Clause 2. The method of Clause 1, where the lower layer signaling comprises downlink control information (DCI) signaling, medium access control (MAC)-control element (CE) signaling, or any combination thereof.

Clause 3. The method of Clause 1 or 2, wherein: the indication of the rule comprises an indication to assume that resources of the channel are non-overlapping with synchronization signal block (SSB) transmissions for the group of PCIs; and the determination of the configuration for the rate matching comprises avoiding rate matching around the unavailable resources.

Clause 4. The method of any of Clauses 1-3, further comprising receiving signaling indicating resources allocated for SSB transmissions for the group of PCIs, wherein: the indication of the rule comprises an indication that at least a portion of resources of the channel that are overlapping with the SSB transmissions for the group of PCIs are the unavailable resources; and the determination of the configuration for the rate matching comprises determining to rate match around the unavailable resources or the resources for the channel overlapping with the SSB transmissions for the group of PCIs.

Clause 5. The method of any of Clauses 1-4, further comprising receiving signaling indicating resources allocated for SSB transmissions for the group of PCIs, wherein: the indication of the rule comprises an indication that at least a portion of resources of the channel that are overlapping with at least one of the SSB transmissions for the one or more selected PCIs of the group of PCIs are the unavailable resources, and that the resources for the channel are non-overlapping with SSB transmissions for non-selected PCIs of the group of PCIs; and the determination of the configuration for the rate matching comprises determining to rate match around the unavailable resources or the resources of the channel overlapping with the SSB transmissions for the one or more selected PCIs.

Clause 6. The method of any of Clauses 1-5, further comprising: receiving, via a cell associated with a PCI of the one or more selected PCIs, an indication scheduling resources for the channel; and receiving signaling indicating resources allocated for SSB transmissions for the group of PCIs, wherein: the indication of the rule comprises an indication that at least a portion of the resources of the channel that are overlapping with at least one of the SSB transmissions via the cell scheduling the resources for the channel are the unavailable resources, and that the resources for the channel are non-overlapping with synchronization signal block (SSB) transmissions for one or more other PCIs of the group of PCIs; and the determination of the configuration for the rate matching comprises determining to rate match around the unavailable resources or the resources overlapping with the at least one of the SSB transmissions via the cell.

Clause 7. The method of any of Clauses 1-6, wherein the indication of the rule comprises a radio network temporary identifier (RNTI) associated with the channel.

Clause 8. The method of Clause 7, wherein receiving the indication of the rule comprises receiving a control channel scrambled with the RNTI.

Clause 9. The method of Clause 7 or 8, wherein the RNTI comprises a system information (SI)-RNTI, and wherein the determination of the configuration is based on whether a control channel scheduling the resources for the channel is scrambled with the SI-RNTI.

Clause 10. The method of Clause 9, wherein the determination of the configuration is further based on a logic state of a system information indicator in downlink control information (DCI) of the control channel.

Clause 11. The method of any of Clauses 7-10, wherein the RNTI comprises a random access (RA)-RNTI, message B (MsgB)-RNTI, paging (P)-RNTI, or temporary cell (TC)-RNTI, wherein the determination of the configuration is based on whether a control channel scheduling resources for the channel is scrambled with the RA-RNTI, the MsgB-RNTI, the paging (P)-RNTI, or the temporary cell (TC)-RNTI.

Clause 12. The method of any of Clauses 1-11, wherein receiving the indication of the rule comprises receiving a system information indicator associated with the channel, and where the indication of the rule comprises the system information indicator.

Clause 13. The method of any of Clauses 1-12, further comprising receiving signaling indicating unavailable resources associated with the group of PCIs, wherein: the indication of the rule comprises an indication that at least a portion of resources of the channel that are overlapping with the unavailable resources are not available; and the determination of the configuration for the rate matching comprises determining to rate match around the resources of the channel that are not available or overlapped with the unavailable resources associated with the group of PCIs.

Clause 14. The method of any of Clauses 1-13, further comprising receiving signaling indicating unavailable resources associated with the group of PCIs, wherein: the indication of the rule comprises an indication that at least a portion of the resources of the channel that are overlapping with the unavailable resources for the one or more selected PCIs of the group of PCIs are not available, and that the resources for the channel are non-overlapping with the unavailable resources for non-selected PCIs of the group of PCIs; and the determination of the configuration for the rate matching comprises determining to rate match around the resources of the channel that are not available or overlapped with the unavailable resources for the one or more selected PCIs.

Clause 15. The method of any of Clauses 1-14, further comprising: receiving, via a cell associated with a PCI of the one or more selected PCIs, an indication scheduling the resources for the channel; and receiving signaling indicating unavailable resources associated with the group of PCIs, wherein: the indication of the rule comprises an indication that at least a portion of the resources of the channel that are overlapping with the unavailable resources associated with the cell scheduling the resources for the channel are not available, and that the resources for the channel are non-overlapping with the unavailable resources for one or more other PCIs of the group of PCIs; and the determination of the configuration for the rate matching comprises determining to rate match around the resources of the channel that are not available or overlapped with the unavailable resources associated with the cell.

Clause 16. The method of any of Clauses 1-15, wherein: the channel is received via a PCI of the one or more selected PCIs; the group of PCIs comprise one or more configured sub-groups of PCIs; the method further comprises: receiving signaling indicating unavailable resources associated with the sub-groups of PCIs; and determining at least one PCI sub-group of the configured sub-groups of PCIs that includes the one or more selected PCIs, one of the at least one PCI sub-group having the PCI via which the channel is received; the indication of the rule comprises an indication that at least a portion of resources of the channel that are overlapping with the unavailable resources associated with the one of the at least one PCI sub-group are not available; and the determination of the configuration for the rate matching comprises determining to rate match around the resources of the channel that are not available or overlapped with the unavailable resources associated with the one of the at least one PCI sub-group.

Clause 17. The method of any of Clauses 1-16, wherein: the group of PCIs comprise one or more configured sub-groups of PCIs; the method further comprises: receiving signaling indicating unavailable resources associated with the sub-group of PCIs; and determining at least one PCI sub-group of the configured sub-groups of PCIs that includes the one or more selected PCIs; the indication of the rule comprises an indication that at least a portion of resources of the channel that are overlapping with the unavailable resources associated with the at least one PCI sub-group are not available; and the determination of the configuration for the rate matching comprises determining to rate match around the resources of the channel that are not available or overlapped with the unavailable resources associated with the at least one PCI sub-group.

Clause 18. The method of any of Clauses 1-17, wherein: multiple candidate rate matching patterns are configured for the group of PCIs; the method further comprising receiving signaling indicating one of the multiple candidate rate matching patterns, the one of the multiple candidate rate matching patterns indicating unavailable resources associated with the one or more selected PCIs; the indication of the rule comprises an indication that at least a portion of the resources of the channel that are overlapping with the unavailable resources associated with the one or more selected PCIs are not available, and that the resources for the channel are non-overlapping with unavailable resources for one or more other PCIs of the group of PCIs; and the determination of the configuration for the rate matching comprises determining to rate match around the resources of the channel that are not available or overlapped with the unavailable resources associated with the one or more selected PCIs.

Clause 19. The method of any of Clauses 13-18, wherein the indication of the rule comprises an indication of a rate matching pattern for the channel, the rate matching pattern indicating the unavailable resources.

Clause 20. The method of Clause 19, wherein the rate matching pattern has resource block (RB) level granularity in a frequency domain and symbol level granularity in a time domain.

Clause 21. The method of Clause 19 or 20, wherein the rate matching pattern has resource element (RE) level granularity in a frequency domain and symbol level granularity in a time domain.

Clause 22. The method of any of Clauses 7-21, wherein the RNTI comprises a cell (C)-RNTI, a modulation and coding scheme (MCS)-C-RNTI, or a configured scheduling (CS)-RNTI, wherein the determination of the configuration is based on whether a control channel scheduling resources for the channel is scrambled with the C-RNTI, MCS-C-RNTI, or CS-RNTI.

Clause 23. The method of any of Clauses 13-22, wherein the determination of the configuration is based whether the channel is scheduled using semi-persistent scheduling (SPS).

Clause 24. The method of any of Clauses 1-23, further comprising transmitting an indication of a capability of the UE to support one or more candidate rules for the determination of the configuration for rate matching, wherein the indication of the rule is selected from the one or more candidate rules.

Clause 25. The method of any of Clauses 1-24, wherein the group of PCIs are associated with multiple transmission-reception points (TRPs) of a cell.

Clause 26. The method of any of Clauses 1-25, wherein the group of PCIs are associated with multiple cells.

Clause 27. A method for wireless communication by a base station, (BS) comprising: transmitting, to a user equipment (UE), an indication of a rule to be used for determining a configuration for rate matching around unavailable resources of a channel, the channel to be transmitted via one or more cells associated with one or more selected PCIs of a group of PCIs configured using lower layer signaling to serve the UE; generating the channel in accordance with the configuration for rate matching; and transmitting the channel to the UE.

Clause 28. The method of Clause 27, where the lower layer signaling comprises downlink control information (DCI) signaling, medium access control (MAC)-control element (CE) signaling, or any combination thereof.

Clause 29. The method of Clause 27 or 28, wherein the indication of the rule comprises an indication to assume that resources of the channel are non-overlapping with synchronization signal block (SSB) transmissions for the group of PCIs.

Clause 30. The method of any of Clauses 27-29, further comprising transmitting signaling indicating resources allocated for SSB transmissions for the group of PCIs, wherein the indication of the rule comprises an indication that at least a portion of resources of the channel that are overlapping with the SSB transmissions for the group of PCIs are the unavailable resources.

Clause 31. The method of any of Clauses 27-30, further comprising transmitting signaling indicating resources allocated for SSB transmissions for the group of PCIs, wherein the indication of the rule comprises an indication that at least a portion of resources of the channel that are overlapping with at least one of the SSB transmissions for the one or more selected PCIs of the group of PCIs are the unavailable resources, and that the resources for the channel are non-overlapping with SSB transmissions for non-selected PCIs of the group of PCIs.

Clause 32. The method of any of Clauses 27-31, further comprising: transmitting, via a cell associated with a PCI of the one or more selected PCIs, an indication scheduling resources for the channel; and transmitting signaling indicating resources allocated for SSB transmissions for the group of PCIs, wherein the indication of the rule comprises an indication that at least a portion of the resources of the channel that are overlapping with at least one of the SSB transmissions via the cell scheduling the resources for the channel are the unavailable resources, and that the resources for the channel are non-overlapping with SSB transmissions for one or more other PCIs of the group of PCIs.

Clause 33. The method of any of Clauses 27-32, wherein the indication of the rule comprises a radio network temporary identifier (RNTI) associated with the channel.

Clause 34. The method of Clause 33, wherein transmitting the indication of the rule comprises transmitting a control channel scrambled with the RNTI.

Clause 35. The method of Clause 33 or 34, wherein the RNTI comprises a system information (SI)-RNTI, and wherein the indication of the rule comprises a control channel scheduling the resources for the channel being scrambled with the SI-RNTI.

Clause 36. The method of Clause 35, wherein the indication of the rule further comprises a logic state of a system information indicator in downlink control information (DCI) of the control channel.

Clause 37. The method of any of Clauses 33-36, wherein the RNTI comprises a random access (RA)-RNTI, message B (MsgB)-RNTI, paging (P)-RNTI, or temporary cell (TC)-RNTI, and wherein the indication of the rule comprises a control channel scheduling resources for the channel being scrambled with the RA-RNTI, the MsgB-RNTI, the paging (P)-RNTI, or the temporary cell (TC)-RNTI.

Clause 38. The method of any of Clauses 27-37, wherein transmitting the indication of the rule comprises transmitting a system information indicator associated with the channel, and wherein the indication of the rule comprises the system information indicator.

Clause 39. The method of any of Clauses 27-38, further comprising transmitting signaling indicating unavailable resources associated with the group of PCIs, wherein the indication of the rule comprises an indication that at least a portion of resources of the channel that are overlapping with the unavailable resources are not available.

Clause 40. The method of any of Clauses 27-39, further comprising transmitting signaling indicating unavailable resources associated with the group of PCIs, wherein the indication of the rule comprises an indication that at least a portion of the resources of the channel that are overlapping with the unavailable resources for the one or more selected PCIs of the group of PCIs are not available, and that the resources for the channel are non-overlapping with the unavailable resources for non-selected PCIs of the group of PCIs.

Clause 41. The method of any of Clauses 27-40, further comprising: transmitting, via a cell associated with a PCI of the one or more selected PCIs, an indication scheduling the resources for the channel; and transmitting signaling indicating unavailable resources associated with the group of PCIs, wherein the indication of the rule comprises an indication that at least a portion of the resources of the channel that are overlapping with the unavailable resources associated with the cell scheduling the resources for the channel are unavailable, and that the resources for the channel are non-overlapping with the unavailable resources for one or more other PCIs of the group of PCIs.

Clause 42. The method of any of Clauses 27-41, wherein: the channel is transmitted via a PCI of the one or more selected PCIs; the group of PCIs comprise one or more configured sub-groups of PCIs; the method further comprises transmitting signaling indicating unavailable resources associated with the group of PCIs, at least one PCI sub-group of the configured sub-groups of PCIs including the one or more selected PCIs, wherein one of the at least one PCI sub-group has the PCI via which the channel is transmitted; and the indication of the rule comprises an indication that at least a portion of resources of the channel that are overlapping with the unavailable resources associated with the one of the at least one PCI sub-group are not available.

Clause 43. The method of any of Clauses 27-42, wherein: the group of PCIs comprise one or more configured sub-groups of PCIs; the method further comprises transmitting signaling indicating unavailable resources associated with the group of PCIs, at least one PCI sub-group of the configured sub-groups of PCIs including the one or more selected PCIs; and the indication of the rule comprises an indication that at least a portion of resources of the channel that are overlapping with the unavailable resources associated with the at least one PCI sub-group are not available.

Clause 44. The method of any of Clauses 27-43, wherein: multiple candidate rate matching patterns are configured for the group of PCIs; the method further comprising transmitting signaling indicating one of the multiple candidate rate matching patterns, the one of the multiple candidate rate matching patterns indicating unavailable resources associated with the one or more selected PCIs; and the indication of the rule comprises an indication that at least a portion of the resources of the channel that are overlapping with the unavailable resources associated with the one or more selected PCIs are not available, and that the resources for the channel are non-overlapping with unavailable resources for one or more other PCIs of the group of PCIs.

Clause 45. The method of any of Clauses 39-44, wherein the indication of the rule comprises an indication of a rate matching pattern for the channel, the rate matching pattern indicating the unavailable resources.

Clause 46. The method of Clause 45, wherein the rate matching pattern has resource block (RB) level granularity in a frequency domain and symbol level granularity in a time domain.

Clause 47. The method of Clause 45 or 46, wherein the rate matching pattern has resource element (RE) level granularity in a frequency domain and symbol level granularity in a time domain.

Clause 48. The method of any of Clauses 33-47, wherein the RNTI comprises a cell (C)-RNTI, a modulation and coding scheme (MCS)-C-RNTI, or a configured scheduling (CS)-RNTI, wherein the indication of the rule comprises a control channel scheduling resources for the channel being scrambled with the C-RNTI, MCS-C-RNTI, or CS-RNTI.

Clause 49. The method of any of Clauses 38-48, wherein the indication of the rule comprises the channel being scheduled using semi-persistent scheduling (SPS).

Clause 50. The method of any of Clauses 27-49, further comprising receiving an indication of a capability of the UE to support one or more candidate rules for the determination of the configuration for rate matching, wherein the indication of the rule is selected from the one or more candidate rules.

Clause 51. The method of any of Clauses 27-50, wherein the group of PCIs are associated with multiple transmission-reception points (TRPs) of a cell.

Clause 52. The method of any of Clauses 27-51, wherein the group of PCIs are associated with multiple cells.

Clause 53. An apparatus, comprising: a memory; and one or more processors coupled to the memory, the memory and the one or more processors being configured to perform a method in accordance with any one of Clauses 1-52.

Clause 54. An apparatus, comprising means for performing a method in accordance with any one of Clauses 1-52.

Clause 55. A non-transitory computer-readable medium comprising executable instructions that, when executed by one or more processors of an apparatus, cause the apparatus to perform a method in accordance with any one of Clauses 1-52.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and base station (BS), next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by user equipments (UEs) with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4-5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. A method for wireless communication by a user equipment (UE), comprising:
receiving lower layer signaling indicating one or more selected physical cell identifiers (PCIs) of a group of PCIs for serving the UE;
receiving an indication of a rule to be used for determining a configuration for rate matching around unavailable resources of a channel to be received via one or more cells associated with the one or more selected PCIs;
receiving, via a cell associated with a PCI of the one or more selected PCIs, an indication scheduling resources for the channel;
receiving signaling indicating resources allocated for synchronization signal block (SSB) transmissions for the group of PCIs, wherein the indication of the rule comprises an indication that at least a portion of the resources of the channel that are overlapping with at least one of the SSB transmissions via the cell scheduling the resources for the channel are the unavailable resources, and that the resources for the channel are non-overlapping with SSB transmissions for one or more other PCIs of the group of PCIs;
determining the configuration for the rate matching based on the rule, wherein determining the configuration comprises determining to rate match around the unavailable resources or the resources overlapping with the at least one of the SSB transmissions via the cell; and receiving the channel via the one or more cells in accordance with the determination.

2. The method of claim 1, where the lower layer signaling comprises downlink control information (DCI) signaling, medium access control (MAC)-control element (CE) signaling, or any combination thereof.

3. The method of claim 1, wherein the indication of the rule comprises a radio network temporary identifier (RNTI) associated with the channel.

4. The method of claim 3, wherein receiving the indication of the rule comprises receiving a control channel scrambled with the RNTI.

5. The method of claim 3, wherein the RNTI comprises a system information (SI)-RNTI, and wherein the determination of the configuration is based on whether a control channel scheduling the resources for the channel is scrambled with the SI-RNTI.

6. The method of claim 5, wherein the determination of the configuration is further based on a logic state of a system information indicator in downlink control information (DCI) of the control channel.

7. The method of claim 3, wherein the RNTI comprises a random access (RA)-RNTI, message B (MsgB)-RNTI, paging (P)-RNTI, or temporary cell (TC)-RNTI, wherein the determination of the configuration is based on whether a control channel scheduling resources for the channel is scrambled with the RA-RNTI, the MsgB-RNTI, the paging (P)-RNTI, or the temporary cell (TC)-RNTI.

8. The method of claim 3, wherein the RNTI comprises a cell (C)-RNTI, a modulation and coding scheme (MCS)-C-RNTI, or a configured scheduling (CS)-RNTI, wherein the determination of the configuration is based on whether a control channel scheduling resources for the channel is scrambled with the C-RNTI, MC S-C-RNTI, or CS-RNTI.

9. The method of claim 1, wherein receiving the indication of the rule comprises receiving a system information indicator associated with the channel, and where the indication of the rule comprises the system information indicator.

10. The method of claim 1, further comprising receiving signaling indicating unavailable resources associated with the group of PCIs, wherein:
the indication of the rule comprises an indication that at least a portion of resources of the channel that are overlapping with the unavailable resources are not available; and
the determination of the configuration for the rate matching comprises determining to rate match around the resources of the channel that are not available or overlapped with the unavailable resources associated with the group of PCIs.

11. The method of claim 10, wherein the indication of the rule comprises an indication of a rate matching pattern for the channel, the rate matching pattern indicating the unavailable resources.

12. The method of claim 11, wherein the rate matching pattern has resource block (RB) level granularity in a frequency domain and symbol level granularity in a time domain.

13. The method of claim 11, wherein the rate matching pattern has resource element (RE) level granularity in a frequency domain and symbol level granularity in a time domain.

14. The method of claim 10, wherein the determination of the configuration is based whether the channel is scheduled using semi-persistent scheduling (SPS).

15. The method of claim 1, further comprising receiving signaling indicating unavailable resources associated with the group of PCIs, wherein:
the indication of the rule comprises an indication that at least a portion of the resources of the channel that are overlapping with the unavailable resources for the one or more selected PCIs of the group of PCIs are not available, and that the resources for the channel are non-overlapping with the unavailable resources for non-selected PCIs of the group of PCIs; and
the determination of the configuration for the rate matching comprises determining to rate match around the resources of the channel that are not available or overlapped with the unavailable resources for the one or more selected PCIs.

16. The method of claim 1, further comprising:
receiving, via a cell associated with a PCI of the one or more selected PCIs, an indication scheduling the resources for the channel; and
receiving signaling indicating unavailable resources associated with the group of PCIs, wherein:
the indication of the rule comprises an indication that at least a portion of the resources of the channel that are overlapping with the unavailable resources associated with the cell scheduling the resources for the channel are not available, and that the resources for the channel are non-overlapping with the unavailable resources for one or more other PCIs of the group of PCIs; and
the determination of the configuration for the rate matching comprises determining to rate match around the resources of the channel that are not available or overlapped with the unavailable resources associated with the cell.

17. The method of claim 1, wherein:
the channel is received via a PCI of the one or more selected PCIs;
the group of PCIs comprise one or more configured sub-groups of PCIs;
the method further comprises:
receiving signaling indicating unavailable resources associated with the sub-groups of PCIs; and
determining at least one PCI sub-group of the configured sub-groups of PCIs that includes the one or more selected PCIs, one of the at least one PCI sub-group having the PCI via which the channel is received;
the indication of the rule comprises an indication that at least a portion of resources of the channel that are overlapping with the unavailable resources associated with the one of the at least one PCI sub-group are not available; and
the determination of the configuration for the rate matching comprises determining to rate match around the resources of the channel that are not available or overlapped with the unavailable resources associated with the one of the at least one PCI sub-group.

18. The method of claim 1, wherein:
the group of PCIs comprise one or more configured sub-groups of PCIs;
the method further comprises:
receiving signaling indicating unavailable resources associated with the sub-group of PCIs; and
determining at least one PCI sub-group of the configured sub-groups of PCIs that includes the one or more selected PCIs;

the indication of the rule comprises an indication that at least a portion of resources of the channel that are overlapping with the unavailable resources associated with the at least one PCI sub-group are not available; and the determination of the configuration for the rate matching comprises determining to rate match around the resources of the channel that are not available or overlapped with the unavailable resources associated with the at least one PCI sub-group.

19. The method of claim 1, wherein:

multiple candidate rate matching patterns are configured for the group of PCIs;

the method further comprising receiving signaling indicating one of the multiple candidate rate matching patterns, the one of the multiple candidate rate matching patterns indicating unavailable resources associated with the one or more selected PCIs;

the indication of the rule comprises an indication that at least a portion of the resources of the channel that are overlapping with the unavailable resources associated with the one or more selected PCIs are not available, and that the resources for the channel are non-overlapping with unavailable resources for one or more other PCIs of the group of PCIs; and the determination of the configuration for the rate matching comprises determining to rate match around the resources of the channel that are not available or overlapped with the unavailable resources associated with the one or more selected PCIs.

20. The method of claim 1, further comprising transmitting an indication of a capability of the UE to support one or more candidate rules for the determination of the configuration for rate matching, wherein the indication of the rule is selected from the one or more candidate rules.

21. The method of claim 1, wherein the group of PCIs are associated with multiple transmission-reception points (TRPs) of a cell.

22. The method of claim 1, wherein the group of PCIs are associated with multiple cells.

23. A method for wireless communication by a base station, (BS) comprising:

transmitting, to a user equipment (UE), an indication of a rule to be used for determining a configuration for rate matching around unavailable resources of a channel, the channel to be transmitted via one or more cells associated with one or more selected PCIs of a group of PCIs configured using lower layer signaling to serve the UE;

transmitting, via a cell associated with a PCI of the one or more selected PCIs, an indication scheduling resources for the channel;

transmitting signaling indicating resources allocated for synchronization signal block (SSB)transmissions for the group of PCIs, wherein the indication of the rule comprises an indication that at least a portion of the resources of the channel that are overlapping with at least one of the SSB transmissions via the cell scheduling the resources for the channel are the unavailable resources, and that the resources for the channel are non-overlapping with SSB transmissions for one or more other PCIs of the group of PCIs;

generating the channel in accordance with the configuration for rate matching; and transmitting the channel to the UE.

24. The method of claim 23, where the lower layer signaling comprises downlink control information (DCI) signaling, medium access control (MAC)-control element (CE) signaling, or any combination thereof.

25. An apparatus for wireless communication by a user equipment (UE), comprising:

memory; and one or more processors coupled to the memory, the one or more processors being configured, individually or collectively, to:

receive lower layer signaling indicating one or more selected physical cell identifiers (PCIs) of a group of PCIs for the UE;

receive an indication of a rule to be used for determining a configuration for rate matching around unavailable resources of a channel to be received via one or more cells associated with the one or more selected PCIs;

receive, via a cell associated with a PCI of the one or more selected PCIs, an indication scheduling resources for the channel;

receive signaling indicating resources allocated for synchronization signal block (SSB)transmissions for the group of PCIs, wherein the indication of the rule comprises an indication that at least a portion of the resources of the channel that are overlapping with at least one of the SSB transmissions via the cell scheduling the resources for the channel are the unavailable resources, and that the resources for the channel are non-overlapping with synchronization signal block (SSB) transmissions for one or more other PCIs of the group of PCIs;

determine the configuration for the rate matching based on the rule by determining to rate match around the unavailable resources or the resources overlapping with the at least one of the SSB transmissions via the cell; and receive the channel via the one or more cells in accordance with the determination.

26. An apparatus for wireless communication by a base station (BS), comprising:

memory; and one or more processors coupled to the memory, the one or more processors being configured, individually or collectively, to:

transmit, to a user equipment (UE), an indication of a rule to be used for determining a configuration for rate matching around unavailable resources of a channel, the channel to be transmitted via one or more cells associated with one or more selected PCIs of a group of PCIs configured using lower layer signaling for the UE;

transmit, via a cell associated with a PCI of the one or more selected PCIs, an indication scheduling resources for the channel;

transmit signaling indicating resources allocated for synchronization signal block (SSB)transmissions for the group of PCIs, wherein the indication of the rule comprises an indication that at least a portion of the resources of the channel that are overlapping with at least one of the SSB transmissions via the cell scheduling the resources for the channel are the unavailable resources, and that the resources for the channel are non-overlapping with SSB transmissions for one or more other PCIs of the group of PCIs;

generate the channel in accordance with the configuration for rate matching; and transmit the channel to the UE.

* * * * *